United States Patent
Wang et al.

(10) Patent No.: US 12,432,109 B2
(45) Date of Patent: Sep. 30, 2025

(54) EDGE SERVER AND EDGE SERVER SYSTEM

(71) Applicant: LENOVO ENTERPRISE SOLUTIONS (SINGAPORE) PTE. LTD., Singapore (SG)

(72) Inventors: Zhaoli Wang, Shanghai (CN); Qipeng Liu, Shanghai (CN); Yan Chen, Shanghai (CN); Jiaao Bai, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 519 days.

(21) Appl. No.: 17/565,055

(22) Filed: Dec. 29, 2021

(65) Prior Publication Data
US 2022/0210007 A1 Jun. 30, 2022

(30) Foreign Application Priority Data
Dec. 31, 2020 (CN) .......................... 202011637505.0

(51) Int. Cl.
*H04L 41/08* (2022.01)
*H04W 24/02* (2009.01)

(52) U.S. Cl.
CPC ............. *H04L 41/08* (2013.01); *H04W 24/02* (2013.01)

(58) Field of Classification Search
CPC ..... H04L 41/08; H04L 41/0668; H04L 43/10; H04L 67/10; H04L 67/148; H04W 24/02
See application file for complete search history.

(56) References Cited

U.S. PATENT DOCUMENTS

| 9,594,653 | B1 * | 3/2017 | Misra | G06F 11/2028 |
| 2013/0035033 | A1 * | 2/2013 | Sanneck | H04W 24/04 455/7 |
| 2018/0331787 | A1 * | 11/2018 | James | H04L 63/0428 |
| 2019/0037639 | A1 * | 1/2019 | Nolan | H04B 7/15528 |
| 2019/0090158 | A1 * | 3/2019 | Das | H04L 67/12 |
| 2021/0084117 | A1 * | 3/2021 | Ovadia | H04L 67/34 |

* cited by examiner

Primary Examiner — Diane L Lo

(57) ABSTRACT

An edge server and edge server system including: a host processor, a switch board controller, and a wireless interface coupled to the host processor and the switch board controller. The switch board controller is configured to route data received through the wireless interface to the host processor if the edge server is in a default mode. The switch board controller is further configured to route the received data independently of the host processor to an alternate edge server via the wireless interface if the edge server is in a relay mode.

19 Claims, 8 Drawing Sheets

800

| Relay Table | | |
|---|---|---|
| Domain # | Edge Server # | Relay Policy |
| Q | u | u – y (nearest node) |
| W | c | c – t (least workload) |
| W | t | t- a (fixed peer) |
| W | a | a – b – c (fixed peer) |
| W | b | b – a – c (fixed peer) |

FIG. 8

EDGE SERVER AND EDGE SERVER SYSTEM

TECHNICAL FIELD

The present disclosure relates to servers, and more particularly to edge servers and related systems.

BACKGROUND

In an internet of things (IoT) system, end devices are used to collect data from the physical environment. The data can be sent to a server in the cloud for storage and processing. Data transmission from the end devices to the server may be interrupted in some situations.

SUMMARY

In one aspect, the present disclosure provides an edge server including: a host processor, a wireless interface configured to receive data, and a switch board controller coupled to the host processor and the wireless interface. The switch board controller is configured to route received data from the wireless interface to the host processor if the edge server is in a default mode, and the switch board controller is further configured to route the received data independently of the host processor to an alternate edge serve via the wireless interface if the edge server is in a relay mode.

Optionally, the wireless interface includes a first wireless interface and a second wireless interface coupled to the first wireless interface, wherein the switch board controller is configured to route the received data from the first wireless interface to the second wireless interface for wireless transmission to the alternate edge server if the edge server is in a relay mode.

Optionally, the switch board controller is further configured to route the received data between the host processor and the alternate edge server, in response to a health state of the host processor.

Optionally, the edge server further includes a peripheral component interconnect express (PCIe) bus. The PCIe bus couples the host processor to the switch board controller, wherein the switch board controller is configured to route the received data to the host processor via the PCIe bus.

Optionally, the edge server is configured to switch to the relay mode in response to a health state of the host processor.

Optionally, the health state of the host processor is determined based on a heartbeat signal between the switch board controller and the host processor.

Optionally, the switch board controller is remotely configurable to identify the alternate edge server according to a relay policy; and instruct the wireless interface to transfer the received data to the alternate edge server.

Optionally, the switch board controller is configured to receive a relay instruction to switch from the default mode to the relay mode, or from the relay mode to the default mode.

Optionally, the switch board controller is configured to determine the at least one alternate edge server according to a relay policy.

Optionally, the at least one alternate edge server is selected based on a physical proximity between the at least one alternate edge server and the edge server.

Optionally, the at least one alternate edge server is selected based on a workload of the at least one alternate edge server.

Optionally, the first wireless interface is configured with a first communication protocol suitable for receiving data from an end device.

Optionally, the second wireless interface is configured with a second communication protocol suitable for enabling communication over a longer range than the first communication protocol.

Optionally, the first communication protocol is a local network communication protocol, and the second communication protocol is a cellular communication protocol.

In another aspect, the present disclosure provides an edge server system. The edge server system includes an end device and an edge server. The edge server includes: a host processor, a wireless interface, and a switch board controller coupled to the host processor and the wireless interface. The wireless interface is configured to receive data from the end device. The switch board controller is configured to route the data received from the end device to the host processor if the edge server is in a default mode. The switch board controller is further configured to transfer received data independently of the host processor from the end device to at least one alternate edge server through the wireless interface if the edge server is in a relay mode.

Optionally, the edge server further includes a peripheral component interconnect express (PCIe) bus, the PCIe bus coupling the host processor with the switch board, and the switch board controller being configured to route the data received from the end device to the host processor via the PCIe bus.

Optionally, the edge server is further remotely configurable such that the switch board controller is configured to switch from the default mode to the relay mode.

Optionally, the switch board controller is configured to determine the at least one alternate edge server according to a relay policy.

Optionally, the at least one alternate edge server is selected based on a physical proximity between the at least one alternate edge server and the edge server. Optionally, the at least one alternate edge server is selected based on a workload of the alternate edge server.

Optionally, the edge server system further includes a cloud server, wherein the edge server in the default mode enables data transfer from the edge server to the cloud server, and wherein if there is a disruption to the data transfer from the edge server to the cloud server, the received data is transferred to the cloud server via the at least one alternate edge server.

Optionally, the edge server is further configured to switch to the relay mode in response to the disruption to the data transfer from the edge server to the cloud server. Optionally, the edge server is further configured to switch to the relay mode before the disruption occurs. Optionally, the edge server is configured to predict the disruption based on a heartbeat signal from the host.

To aid understanding of the technical solution disclosed herein, examples will be described with the aid of accompanying drawings.

BRIEF DESCRIPTION OF DRAWINGS

FIG. 8 is a relay table according to an embodiment of the present disclosure.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, that the various embodiments be practiced without one or more of the specific details, or with other methods, components, materials, etc. In other instances, some or all known structures, materials, or operations may not be shown or described in detail to avoid obfuscation.

An IoT (internet of things) system, including industrial internet of things (IIoT) systems, can include one or more end devices coupled to one or more servers. End devices can include relatively stationery devices or mobile devices. IoT systems find applications in a wide variety of situations such as traffic management systems, public security, autonomous vehicles, smart homes, smart cities, smart manufacturing, digital agriculture, logistics, digital health, environment monitoring, etc. It is therefore increasingly likely that end devices are distributed over a large area or are located at relatively inaccessible places. If data communication at or near an end device is disrupted, valuable data may be lost in the interim period before data communication is restored.

Figure 1:
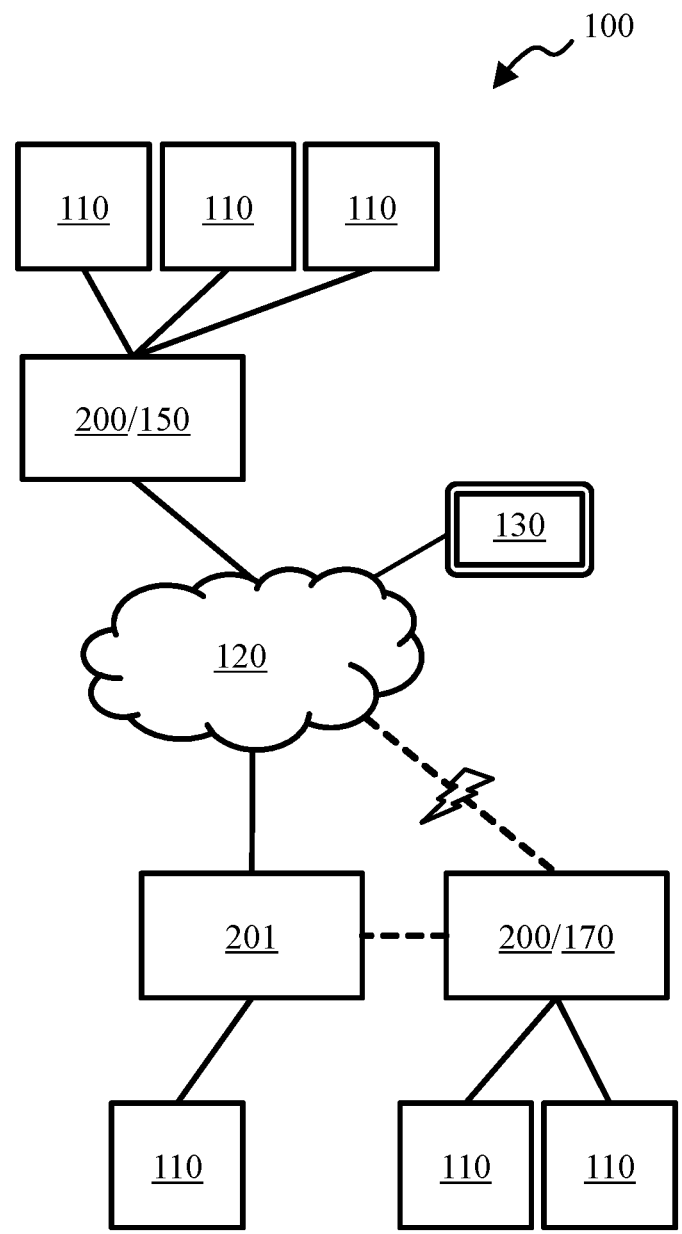
FIG. 1 illustrates an edge server system according to one embodiment of the present disclosure.

FIG. 1 schematically illustrates an edge server system (100) in which one or more end devices (110) are configured to collect data. According to embodiments of the present disclosure, an edge server (200/201) is configured to receive data from the one or more end devices. In the present disclosure, an edge server refers to a computing device configured as an entry point to the cloud. An edge server can also be described as a computing device that is physically at or near to the end device or to data source. The term "edge server" may be used interchangeably with "edge node", "edge computing device", or "edge device".

In one example, a plurality of end devices (110) may be in the form of sensors that are distributed at various locations at a site. Edge servers (200/201) can be provided at selected locations at the same site near the end devices for various reasons, including, to facilitate high speed computing performance. In other words, the edge servers may be located outside the traditional server room environment so as to be physically closer to the end devices. Examples of where the end devices and/or edge servers may be deployed include manufacturing plants, retail shops, residential buildings, commercial buildings, logistics facilities, transportation equipment, etc. The edge servers may be coupled to a cloud server (120) in the cloud. The cloud server may be one or more physical computing devices. The cloud server may be located at one or multiple locations, either at the same site as or off-site. The term "cloud server" may be used interchangeably with "central cloud", "central server", or "server". The cloud server may refer to a private network, a public network, a hybrid network, a device in the cloud, or generally to one or more computing devices connected to the internet. Other terms that may be used interchangeably with "cloud server" include data centers, server farms, application servers, file servers, etc.

The edge server system (100) may include an end device (110) and an edge server (200). The edge server (200) includes a host (210) having a host processor (212), and a switch board (220) coupled to the host (210). The edge server (200) is configured with at least one wireless interface (270), such that data from the end device (110) can be received via the at least one wireless interface (270) by the edge server (200), and such that the edge server (200) can route the received data to the host processor (212), or such that the edge server (200) can route the received data via one of the at least one wireless interface to at least one other edge server (201). For example, the edge server (200) may be provided with a first wireless interface and a second wireless interface. The first wireless interface and the second wireless interface are disposed on the switch board (220). Each of the first wireless interface and the second wireless interface may be respectively coupled to the host processor (212). The edge server (200) includes a switch board controller (230). The switch board controller (230) is configured such that, if the edge server is in a default mode (150), data that is received via the first wireless interface is routed to the host processor (212). The edge server is further configured to have a relay mode (170) in addition to the default mode. The switch board controller (230) is configured such that, if the edge server (200) is in the relay mode (170), data that is received via the first wireless interface is routed to the second wireless interface. The switchboard then routes the received data via the second wireless interface to at least one other edge server (201). In this document, the one other edge server is also referred to as the alternate edge server (201). Alternatively, data that is received via the first wireless interface may be routed directly to at least one alternate edge server (201). The switch board controller (230) may be configured to transfer data originating from the end device (110) to at least one alternate edge server (201) if the edge server (200) is in a relay mode (170). In this disclosure, the terms "route", "transfer", "transmit", and "relay" are used interchangeably.

It should be appreciated that instead of having separate first and second wireless interfaces, the edge server (200) may instead include only a single wireless interface (270). The edge server (200) is configured to receive data from the end device (110) via the single wireless interface (270). The edge server may be configured such that, when operating in the default mode (150) it then routes the received data to the host processor (212), or when operating in the relay mode (170) it then routes the received data via the same wireless interface to the alternate edge server (201). Alternatively, the edge server (200) may include an integrated wireless interface including the first and second wireless interfaces, wherein the first wireless interface is operable to receive data from the end device (110), such that if the edge server (200) is in the default mode (150) the received data is subsequently routed to the host processor (212), or if the edge server (200) is in the relay mode (170) the received data is routed to the second wireless interface so that the received data is wirelessly transmitted to the alternate edge server (201).

The edge server system (100) may further include a cloud server (120). In the default mode (150), the edge server (200) is configured to enable data transfer from the edge server (200) to the cloud server (120), as shown in FIG. 1. If there is a disruption to the data transfer from the edge server (200) to the cloud server (120), data that is received at the first wireless interface is transferred to the cloud server via the at least one alternate edge server (201). The edge server (200) may be remotely configurable such that the switch board controller (230) is configured to switch from the default mode (150) to the relay mode (170) according to a relay policy (FIG. 8). The remote configuration of the edge server may be performed with the aid of a user interface (130) coupled to the cloud server (120). The remote configuration may include setting or selecting a relay policy (800) for the edge server (200). The relay policy (800) determines at least one method of selecting the at least one alternate edge server (201). The at least one alternate edge server (201) may be any edge server configured to transfer data directly to the cloud server (120). The at least one alternate edge server (201) may be an edge server similarly configured with a relay mode (170) as described above. The at least one alternate edge server (201) may be configured with a switch board controller (230) and a host processor (212). The selection of another device or another edge server may be dependent on the relay policy (800). For example, the switch board controller (230) of the edge server may be remotely configurable to identify the alternate edge server (201) according to the relay policy (800), and to configure the wireless interface (270) or the second wireless interface (260) to transfer data to the alternate edge server (201).

Figure 2A:
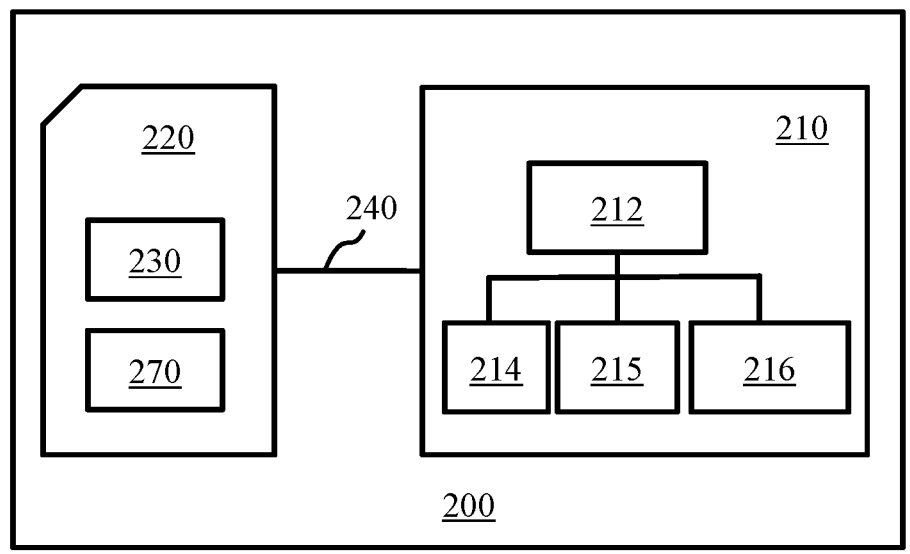
FIG. 2A and FIG. 2B are schematic block diagrams showing alternative embodiments of an edge server.

FIG. 2A shows a schematic block diagram of an edge server (200) according to one embodiment of the present disclosure. The edge server (200) includes a switch board (220) and a host (210). The switch board (220) can be coupled to the host (210). The host (210) can include a host processor (212) coupled to an input/output (I/O) interface (214), a random-access memory (RAM) (215), and a data storage device (216). The host processor (212) is coupled to the I/O interface (214), the RAM (215), and the data storage device (216). The edge server (200) is configured such that data from an end device, the cloud server, another edge server, or any other device, is received by the switch board (220). The switch board (220) includes a switch board controller (230) and a wireless interface (270) configured to receive data. The switch board controller (230) is coupled to the host processor (212) and the wireless interface (270). In some embodiments, the wireless interface (270) can be a single wireless interface. In some embodiments, the wireless interface (270) can be an integrated wireless interface including a first wireless interface (250) and a second wireless interface (260).

Figure 2B:
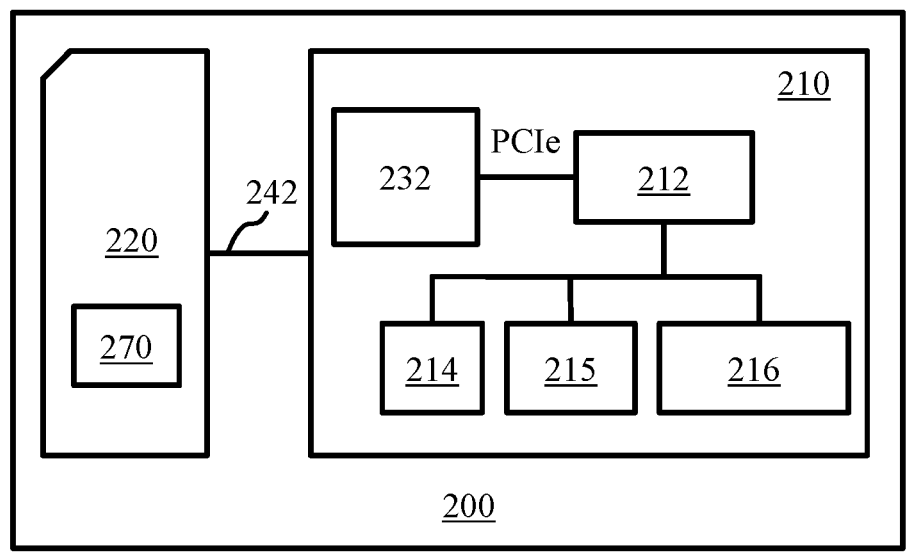
Figure 3:
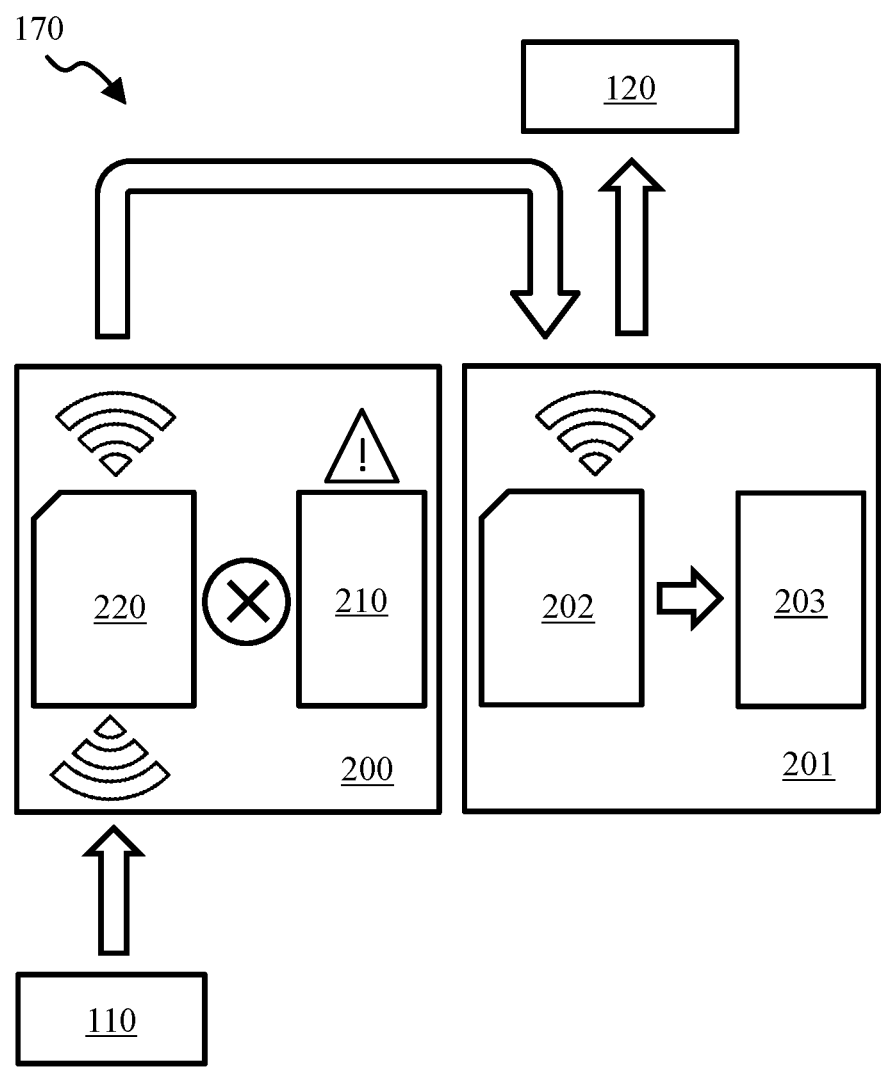
FIG. 3 is a schematic block diagram showing data transfer in a relay mode according to one embodiment of the present disclosure.
Figure 4:
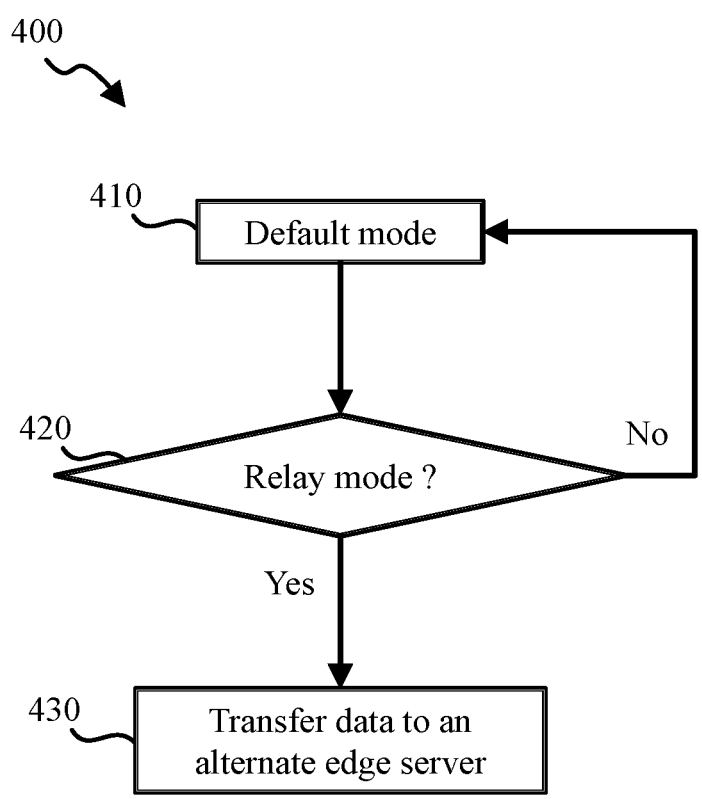
FIG. 4 is a process flow diagram according to one embodiment of the present disclosure.

FIG. 2B shows a schematic block diagram of an edge server (200) according to another embodiment in which the switch board driver (232) is disposed on or embedded in a device in the host (210). The switch board (220) and the host (210) may communicate via a PCIe bus or a universal serial bus (USB) (242). In the present document, the terms "switch board controller" and "switch board driver" will be used interchangeably for the sake of brevity. The switch board controller (230/232) may be disposed on the switch board (220) or on the host (210). The switch board controller (230) may be a standalone device or integrated with other devices in the edge server (200). In any of these embodiments, the switch board controller (230) is configured to control the switch board (220) and processes related to the switch board (220). In these and other embodiments of the present disclosure, the edge server (200) is configured such that, in a default mode (150), data that is received by the switch board is routed to the host processor (212) for processing and/or storage. The default mode (150) describes the edge server in its normal operating condition. The edge server (200) is further configured to perform a relay operation (400). As illustrated in FIG. 3 and FIG. 4, the edge server may be operating (410) in the default mode until it switches over to the relay mode. When the edge server determines (420) that it is in the relay mode, data that is received by the switch board is transferred (430) to an alternate edge server instead of being routed to the host processor (212). In some examples, the switch board controller of the edge server (200) is configured to directly route received data from the first wireless interface to the second wireless interface, instead of routing the received data from the first wireless interface through the PCIe bus (240) to the host processor (212). The edge server (200) may be configured such that, in the relay mode (170), data is not transferred from the switch board (220) to the host processor (212) for processing and/or storage. In the present disclosure, "data" includes data and/or instructions.

The switch board (220) may be configured to monitor or predict a health state of the host (210) or of the host processor (212). Alternatively, the switch board may be provided with a health state of the host processor, in which the health state of the host processor refers to either or both of a health state of the host and the health state of the host processor. In some examples, the switch board may be configured to monitor or predict (420) a health state of the host processor or a critical component of the host. The edge server or the switch board may be configured to switch (420) to the relay mode in response to a health state of the host processor. For example, the edge server may be configured to switch to the relay mode in response to a relay instruction received from the cloud server, in which the relay instruction is based on or dependent on a health state of the host processor (420). For example, the switch board controller may be configured to enable data to be directly routed between the first wireless interface and the second wireless interface, in response to a health state of the processor (420). For example, the edge server may be configured so that the edge server switches from the default mode to the relay mode if the host processor is determined (420) to be in a health state that is deemed to be unhealthy. The edge server may be configured to switch to the relay mode in response to predicting (420) that the host processor is likely to enter into a health state of being unhealthy. The host processor may be deemed (420) to be in a normal health state if the host processor or a critical component of the host can perform its intended function. For example, the switch board may determine (420) that the host processor is in a healthy state (or in a health state that is deemed healthy) if the host processor can return or echo a heartbeat signal back to the switch board. The health state of the host processor may be determined (420) based on a heartbeat signal transmitted between the switch board and the host processor. The host processor may be deemed (420) to be in a health state that is equivalent to an unhealthy state, if the host processor or a critical component of the host is unable to perform its intended function. The host processor may be deemed (420) to be in a health state that is considered to be an unhealthy state, if the edge server is unable to directly transfer data to the cloud server. The edge server may be configured to switch to the relay mode in response to a disruption to data transfer between the edge server and the cloud server. In some examples, the edge server is configured to switch (420) to the relay mode before the disruption occurs. In some examples, the edge server is configured to predict (420) the disruption based on a heartbeat signal returned by the host processor. In some examples, the edge server is configurable to switch (420) to the relay mode at a predetermined time. For example, if the edge server is scheduled to undergo maintenance, the edge server may be configured to switch to the relay mode at a predetermined time so as to minimize disruption resulting from the maintenance. The edge server may be configured to switch from the relay mode back to the default mode when the host processor is again in a health state that is considered a healthy state. The edge server may be configured to switch from the relay mode back to the default mode when the cause of the disruption has been resolved. The disruption may be in the form of an interruption to data transfer or in the form of a transfer rate that is below an acceptable level. The disruption may be a result of malfunction or overheating of the host, the host processor, or another component of the edge server.

Figure 5:
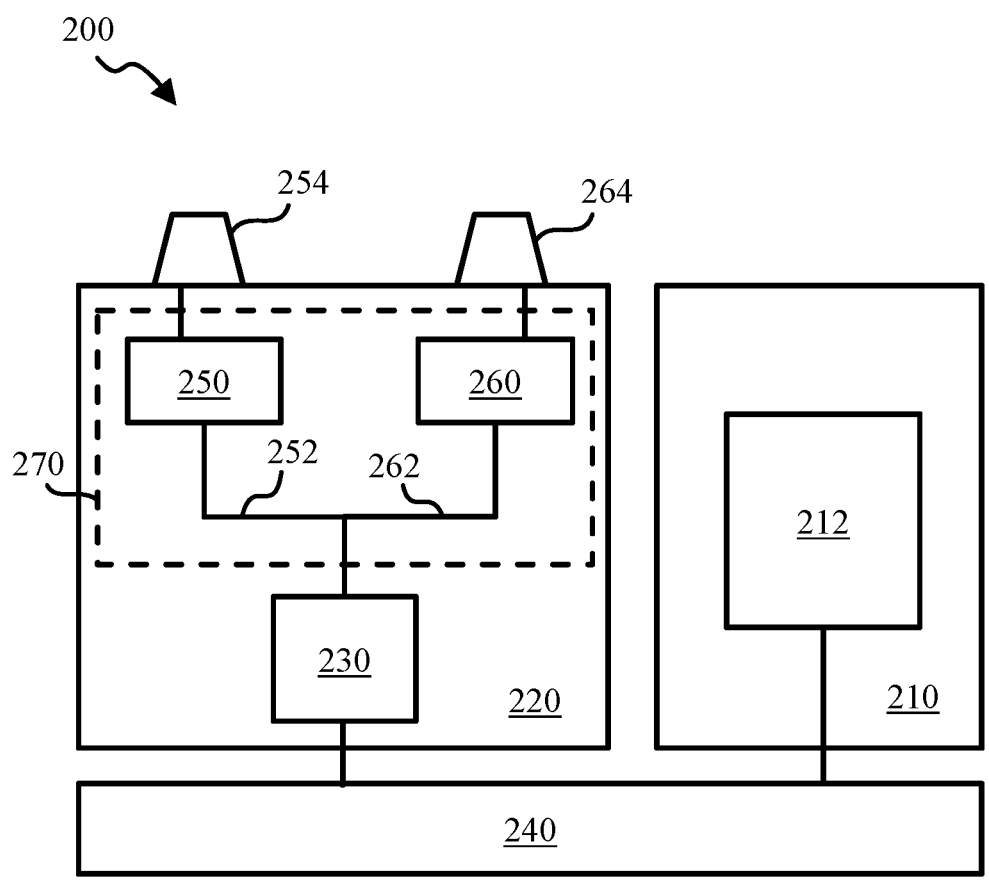
FIG. 5 is a schematic block diagram showing a more detailed construction of an edge server according to one embodiment of the present disclosure.

FIG. 5 is a schematic block diagram showing an edge server (200) according to one embodiment of the present disclosure. The edge server (200) includes a switch board (220) and a host (210) coupled by a peripheral component interconnect express (PCIe) bus (240), in which the host (210) serves as a PCIe host and the switch board (220) is configured as a PCIe slave. The switch board (220) includes a switch board controller (230) and a wireless interface (270). In some embodiments, the wireless interface (270) can be a single wireless interface. In some embodiments, the wireless interface (270) can be an integrated wireless interface including a first wireless interface (250) and a second wireless interface (260). In some examples, the host processor (212) includes a switch board driver (232), as shown in FIG. 2B. The PCIe bus (240) provides data interface and control interface between the switch board (220) and the host (210). Accordingly, the switch board controller (230) is operable to transmit received data from an end device (110) to the host processor (212) via the PCIe bus (240).

The switch board controller (230) is further configured to receive a relay control instruction such that the edge server (200) switches from the default mode (150) to the relay mode (170), or such that the edge server (200) switches from the relay mode (170) to the default mode (150). The switch board controller (230) may be configured such that, in the relay mode (170), data received by the switch board (220) from an end device (110) is routed directly via the wireless interface (270) independently of the host processor (212) to at least one alternate edge server (201). In the relay mode (170), data received by the switch board (220) from the end device (110) is made to bypass the host processor (212) or the PCIe bus (240) leading to the host processor (212). In some examples, in the relay mode (170), the PCIe bus (240) couples the host (210) with the switch board (220), and the switch board controller (230) is configured to route received data from the first wireless interface (250) to the second wireless interface (260) instead of routing the received data from the first wireless interface (250) to the PCIe bus (240) leading to the host processor (212).

The switch board (220) can be configured with a single wireless interface (270). The wireless interface (270) can be configured to receive data from an end device (110) and to transfer the received data according to a communication protocol. In some examples, the communication protocol may be a local network communication protocol or a cellular communication protocol. In some embodiments, the wireless interface (270) is provided in the form of a wireless fidelity (Wi-Fi) module or a long-term evolution (LTE) module. In some examples, the switch board controller (230) can be integrated in the form of a system-on-chip (SoC) device. In other examples, the wireless interface (270) may be coupled to the switch board controller by a USB or a PCIe bus. The wireless interface(270) is coupled to an antenna. The antenna may be a Wi-Fi antenna or an LTE antenna.

Optionally, the wireless interface (270) can be configured as an integrated wireless interface including a first wireless interface (250) and a second wireless interface (260). The switch board (220) is configured to enable received data to be transferred directly between the first wireless interface (250) and the second wireless interface (260). The first wireless interface (250) can be configured to receive data from an end device (110) according to a first communication protocol. The second wireless interface (260) can be configured to transfer received data according to a second communication protocol. The second communication protocol may be one suitable for enabling communication over a longer range than the first communication protocol. In some examples, the first communication protocol may be a local network communication protocol and the second communication protocol may be a cellular communication protocol. In some embodiments, the first wireless interface (250) is provided in the form of a wireless fidelity (Wi-Fi) module, and the second wireless interface (260) is provided in the form of a long-term evolution (LTE) module. In some embodiments, the first wireless interface (250) and the second wireless interface (260) may be presented as an integrated module for transferring received data in accordance with both a first communication protocol and a second communication protocol. In some embodiments, the integrated module may be configured to transfer received data according to a Wi-Fi protocol and an LTE protocol. In some examples, the switch board controller (230) can be integrated in the form of a system-on-chip (SoC) device. In some examples, the Wi-Fi module and the LTE module are integrated as part of the SoC device. In other examples, the Wi-Fi module (250) may be coupled to the switch board controller by a first USB (252) or a first PCIe bus (252). Similarly, the LTE module (260) may be coupled to the switch board controller (230) by a second USB (262) or by a second PCIe bus (262). The first wireless module (250) may be coupled to a first antenna (254). The first antenna (254) may be a Wi-Fi antenna. The second wireless module (260) may be coupled to a second antenna (264). The second antenna (264) may be an LTE antenna.

It can be appreciated that a switch board of the present disclosure can operate in a default mode or in a relay mode even if the host processor is not able to operate at its originally intended level of performance. In some embodiments, the switch board can continue to operate substantially independently of the host processor.

Figure 6:
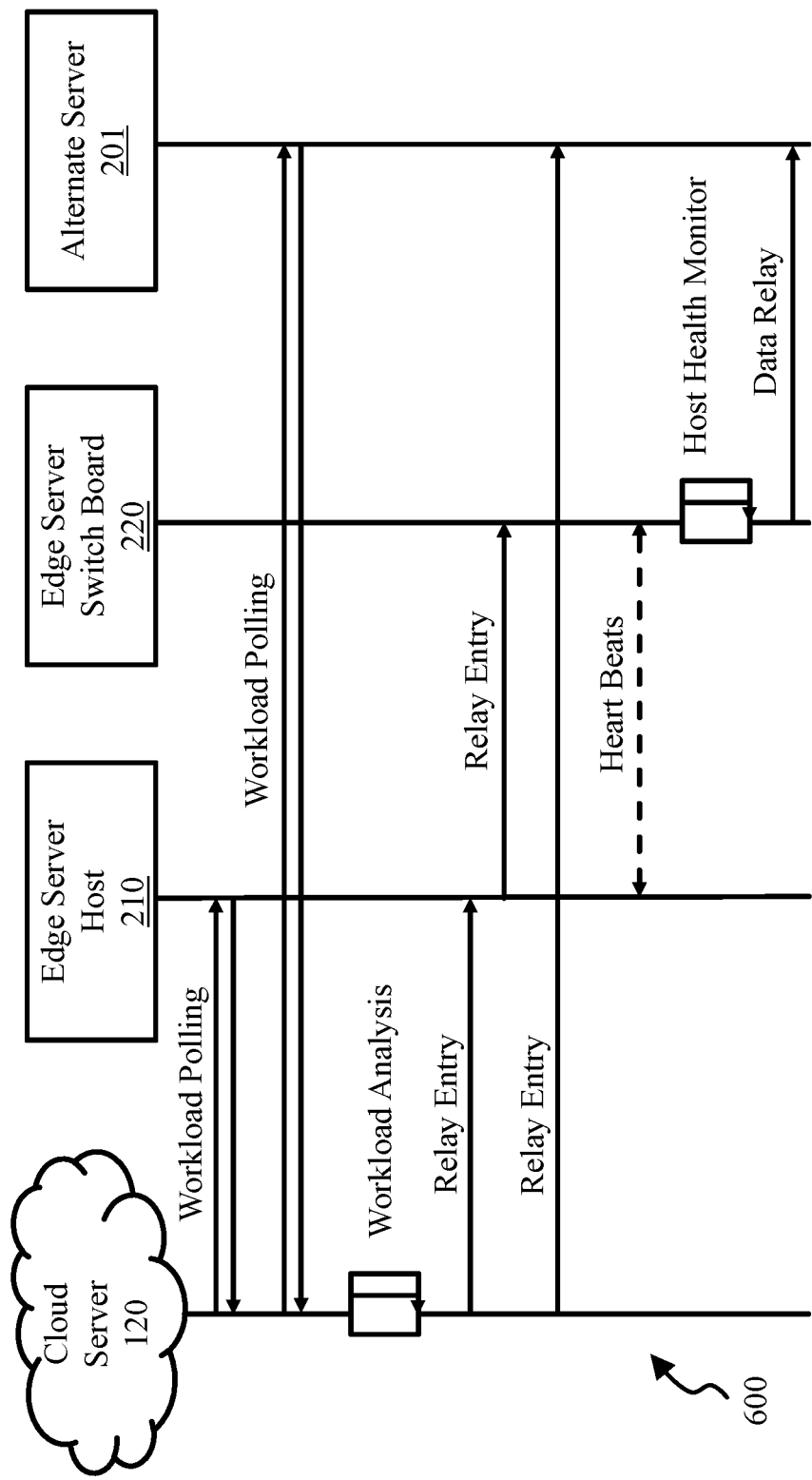
FIG. 6 is a workflow diagram according to another embodiment of the present disclosure.
Figure 7:
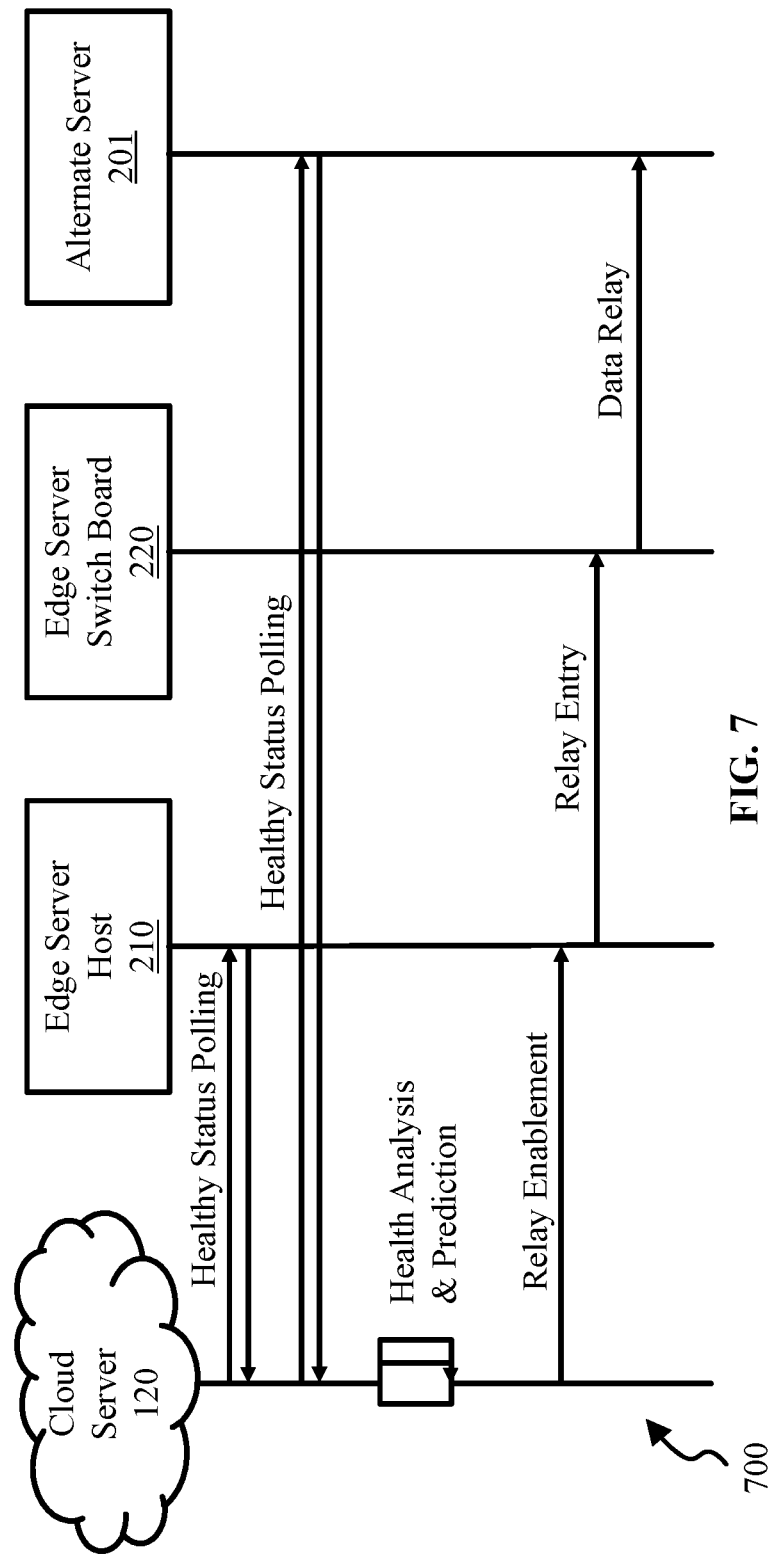
FIG. 7 is a workflow diagram according to another embodiment of the present disclosure.

FIG. 6 and FIG. 7 show workflow diagrams (600/700) of an edge server system according to various embodiments of the present disclosure. The cloud server may be configurable by a user with the aid of a user interface (130). The cloud server may be provided with a relay table (800), an example of which is shown in FIG. 8. The relay table defines one or more relay policies for the edge server system.

In one exemplary workflow (600), as shown in FIG. 6, according to the relay policy, at least one alternate edge server (201) is assigned to an edge server (200) based on the workload of the alternate edge server. The relay policy may also define a set of relay conditions under which the edge server (200) will operate in the relay mode (170). In this example, the cloud server (120) is configured to perform workload polling of a plurality of edge servers (200) in a network. The cloud server (120) is further configured to perform workload analysis based on the workload polling data. The cloud server (120) is thus able to determine the relative workload of the respective servers at any one time. The alternate edge server (201) may be selected based on a workload of the at least one alternate edge server (201). The cloud server (120) may be configured to identify at least one alternate edge server (or another suitably configured server) that has spare capacity to undertake more work. The identity of the at least one alternate edge server may be provided to the host (210) of an edge server and to the switch board (220) of the edge server in the form of a relay instruction. The cloud server (120) may provide a corresponding relay instruction to the alternate edge server (201), such that the alternate edge server (201) is configured to relay data that it receives from the edge server (200) to the cloud server (120). The alternate edge server (201) may be configured to process and/or store data that it receives from the edge server (200), such that it serves as a replacement for the edge server (200). If the relay policy defines a relay route involving more than one alternate edge server (201), received data may be transferred along the relay route from one alternate edge server (201) to another alternate edge server (201) in turn, until the received data is transferred by a last alternate edge server (201) to the cloud server (120). In this example, the relay conditions include a health state of the host processor or host processor. Various different schemes may be used for determining or predicting a health state of the host or host processor. The health state of the host processor may be deemed unhealthy or predicted as unhealthy, based on the health state of any one of the following: the host processor, the host, and a critical component of the host. As an example, the health state may be based on a heartbeat signal. For example, a heartbeat signal may be transmitted between the switch board (220) of the edge server and the host of the edge server. The heartbeat signal may be a series of signals received by the switch board (220) from the host processor (212) of the host, in which the heartbeat signal is useful for determining or predicting a health state of the host (210). The health state of the host may be determined by a host health monitor. The host health monitor may be part of the switch board (220). The health state of the host may be determined based on the heartbeat signal transmitted between the switch board (220) and the host processor (212). If the host health monitor determines that the host (210) has deteriorated in health and that the host is operating below an acceptable performance level, the edge server (200) relays the data it receives to the alternate edge server (210) in accordance with the relay instruction. The data may be processed or stored by the alternate edge server (201), or the data may be transferred by the alternate edge server (201) to the cloud server (120). According to how the relay policy is configured, the alternate edge server may (201) take over the work of the edge server (200) before disruption occurs. Disruption may be in the form of disruption to the data transfer between the edge server (200) and the cloud server (120), or disruption to the data transfer from the edge server (200) to the cloud server (120). Data sent by one or more end devices (110) to the edge server (200) can thus be captured and used even in the interim period when the edge server is operating below an acceptable performance level. This helps to ensure that the edge server system continues to operate at an acceptable performance level during the interim period when the edge server may be repaired or replaced. From the perspective of the user, especially a user who is not an expert in server technology, there is thus no disruption to the data transfer from the edge server to the cloud server. The edge server system is thus able to implement predictive maintenance based on a real-time health state of respective edge servers (200) in the network.

FIG. 7 illustrates another example workflow (700) in which the relay policy determines at least one method of selecting or assigning the alternate edge server based on other factors besides workload. Referring also to FIG. 8, the relay policy may assign an alternate edge server (201) according to which other server in the same domain is physically nearest to the edge server (200). That is, the relay policy may be configured such that the at least one alternate edge server (201) is selected based on its physical proximity to the edge server (200). Alternatively, the relay policy may be based on a fixed peer method, in which the edge server (200) is associated with an alternate edge server (201) in the same or in another domain. If the relay policy defines more than one alternate edge server, the relay policy may further define a sequence of the alternate edge servers so as to transfer the data in turn.

In this example, the relay policy also defines a set of relay conditions under which the edge server is switched to operate in the relay mode. In this example, the cloud server (120) is configured to perform a health state polling of a plurality of edge servers (200) in a network. Based on the health state, the cloud server (120) is configured to perform analysis and prediction, such that the cloud server (120) is able to proactively detect or predict that one of the edge servers (200) is about to fail or about to perform below an acceptable performance level. The cloud server (120) may also be configured to determine that one of the edge servers (200) should undergo maintenance or investigation. The cloud server (120) may send a relay instruction to the edge server (200) so that the edge server switches to a relay mode (170). The relay instructions may be sent by the cloud server (120) to the host processor (212) of the edge server, and the host processor (212) of the edge server may accordingly instruct its switch board (220) through a relay instruction. This results in the edge server (200) being switched to the relay mode (170). The edge server (200) is thus remotely configurable such that the switch board controller (220) is configured to switch from the default mode (150) to the relay mode (170) according to the relay policy. The edge server (200) in the relay mode (170) performs data relay to the alternate edge server (201) selected according to the relay policy. In the meantime, the host (210) of the edge server can undergo maintenance, repair, or replacement, without disruption to the service originally provided by the edge server (200).

FIG. 8 shows a relay table defining various relay policies (800). As an example, a relay policy for edge server #u in domain Q defines a relay route in which the nearest node or the nearest edge server #y is designated the alternate edge server. Referring also to FIG. 3, if edge server #u is in the relay mode, the data received at the Wi-Fi interface of the switch board of the edge server #u is transferred directly to the LTE interface of the switch board of the edge server #u. The received data is then sent from the LTE interface of the edge server #u to the LTE interface of the alternate edge server #y. The alternate edge server #y can further send the data received at its LTE interface to the cloud server. Therefore, the data communications between the end devices of the edge server #u and the cloud server can be achieved by data relay through the alternate edge server #y. Interruption of data communication can thus addressed.

In another example, the relay policy is based on a least workload method, in which the server #t is selected to serve as an alternate edge server for an edge server #c, if the server #t is the server with the least workload among the various servers in the same domain #W.

In another example, the relay policy is based on a fixed peer method such that an edge server #a in the same domain #W is associated with the edge server #t. The relay route defined by the relay policy can be described as a predetermined route from the edge server #t to the alternate edge server #a.

In yet another example, the relay policy defines more than one alternate edge servers in a sequence or a relay route from the edge server to the cloud server (120). For example, if the edge server #a in domain #W switches to a relay mode, according to the relay policy, data received by the switch board of server #a will be transferred to an alternate edge server #b. This data that is received by the alternate edge server #b will be transferred to another alternate edge server #c. The alternate edge server #c then transfer the data to the cloud server (120), thereby completing the relay route.

In yet another example, if the switch board of the edge server #b in domain W switches to a relay mode, received data will be routed or relayed from the switch board of the edge server #b to the alternate edge server #a, and then from the alternate edge server #a to an alternate edge server #c, from whence the data is transferred to the cloud server. It can be appreciated that more than two alternate edge servers may be deployed in a relay route. The relay policy can be configured remotely by a user with the aid of a suitable user interface (130), and can thus be adapted to suit a wide variety of applications.

As used herein, the singular 'a' and 'an' may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments have been chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one of ordinary skill in the art without departing from the scope of the disclosure.

The invention claimed is:

1. An edge server comprising:
   a host processor;
   a wireless interface configured to receive data; and
   a switch board controller coupled to the host processor and the wireless interface, wherein the switch board controller is configured to route received data from the wireless interface to the host processor if the edge server is in a default mode, wherein the switch board controller is further configured to route the received data independently of the host processor to at least one alternate edge server via the wireless interface if the edge server is in a relay mode, and wherein the switch board controller is configured to receive, from a cloud server, a relay instruction to switch from the default mode to the relay mode, or from the relay mode to the default mode.

2. The edge server according to claim 1, wherein the wireless interface comprises:
   a first wireless interface; and
   a second wireless interface coupled to the first wireless interface, wherein the switch board controller is configured to route the received data from the first wireless interface to the second wireless interface for wireless transmission to the at least one alternate edge server if the edge server is in the relay mode.

3. The edge server according to claim 2, wherein the first wireless interface is configured with a first communication protocol suitable for receiving data from an end device.

4. The edge server according to claim 3, wherein the second wireless interface is configured with a second communication protocol suitable for enabling communication over a longer range than the first communication protocol.

5. The edge server according to claim 4, wherein the first communication protocol is a local network communication protocol, and wherein the second communication protocol is a cellular communication protocol.

6. The edge server according to claim 1, wherein the switch board controller is further configured to route the received data between the host processor and the at least one alternate edge server, in response to a health state of the host processor.

7. The edge server according to claim 1, further comprising:
   a peripheral component interconnect express (PCIe) bus, the PCIe bus coupling the host processor with the switch board controller, wherein the switch board controller is configured to route the received data to the host processor via the PCIe bus.

8. The edge server according to claim 1, wherein the edge server is configured to switch to the relay mode in response to a health state of the host processor.

9. The edge server according to claim 8, wherein the health state of the host processor is determined based on a heartbeat signal between the switch board controller and the host processor.

10. The edge server according to claim 1, wherein the switch board controller is remotely configurable to:
    identify the at least one alternate edge server according to a relay policy; and
    instruct the wireless interface to transfer the received data to the at least one alternate edge server.

11. The edge server according to claim 1, wherein the switch board controller is configured to determine the at least one alternate edge server according to a relay policy.

12. The edge server according to claim 11, wherein the at least one alternate edge server is selected based on a physical proximity between the at least one alternate edge server and the edge server.

13. The edge server according to claim 11, wherein the at least one alternate edge server is selected based on a workload of the at least one alternate edge server.

14. An edge server system comprising:
    an end device; and
    an edge server including:

a host processor;
a wireless interface configured to receive data from the end device; and
a switch board controller coupled to the host processor and the wireless interface, wherein the switch board controller is configured to route the data received from the end device to the host processor if the edge server is in a default mode, wherein the switch board controller is further configured to transfer received data independently of the host processor from the end device to at least one alternate edge server through the wireless interface if the edge server is in a relay mode, and wherein the switch board controller is configured to receive, from a cloud server, a relay instruction to switch from the default mode to the relay mode, or from the relay mode to the default mode.

15. The edge server system according to claim 14, wherein the edge server further comprises a peripheral component interconnect express (PCIe) bus, the PCIe bus coupling the host processor with the switch board controller, and wherein the switch board controller is configured to route the received data to the host processor via the PCIe bus.

16. The edge server system according to claim 14, wherein the edge server is further remotely configurable such that the switch board controller is configured to switch from the default mode to the relay mode.

17. The edge server system according to claim 16, wherein the switch board controller is configured to determine the at least one alternate edge server according to a relay policy.

18. The edge server system according to claim 17, wherein the at least one alternate edge server is selected based on a physical proximity between the at least one alternate edge server and the edge server.

19. The edge server system according to claim 17, wherein the at least one alternate edge server is selected based on a workload of the at least one alternate edge server.

\* \* \* \* \*